United States Patent [19]

Durand et al.

[11] Patent Number: 5,723,403
[45] Date of Patent: Mar. 3, 1998

[54] PRODUCTION PROCESS FOR CATALYSTS ON SUPPORTS INCLUDING A CENTRIFUGING STEP FOR THE SUPPORT AFTER COATING

[75] Inventors: Daniel Durand, Rueil Malmaison; Gil Mabilon, Carrieres Sur Seine; Isabelle Guibard, Rueil Malmaison, all of France

[73] Assignee: Institut Francais Du Petrole, Rueil-Malmaison, France

[21] Appl. No.: 282,468

[22] Filed: Jul. 29, 1994

[30] Foreign Application Priority Data

Jul. 29, 1993 [FR] France ................... 93 09482

[51] Int. Cl.$^6$ ................... B01J 23/02; B01J 23/10; B01J 23/38
[52] U.S. Cl. ................ 502/304; 502/305; 502/325; 502/339; 502/340; 502/344; 502/349; 502/355; 427/240; 427/241; 427/272; 34/58
[58] Field of Search ................... 502/60, 74, 240, 502/257, 307, 304, 305, 325, 339, 340, 344, 349, 355; 427/240, 241, 272; 34/58, 315

[56] References Cited

U.S. PATENT DOCUMENTS

| | | | |
|---|---|---|---|
| 3,257,732 | 6/1966 | Webster | 34/8 |
| 4,404,007 | 9/1983 | Tukao et al. | 55/523 |
| 4,585,625 | 4/1986 | Chadwick et al. | 423/236 |
| 4,637,146 | 1/1987 | Motoki et al. | 34/58 |
| 4,650,699 | 3/1987 | Mosser et al. | 427/240 |
| 4,867,857 | 9/1989 | von Benda et al. | 204/290 R |
| 4,900,712 | 2/1990 | Bar-Ilan et al. | 502/304 |
| 5,179,061 | 1/1993 | Haerle | 502/339 |
| 5,208,206 | 5/1993 | Yasaki et al. | 502/334 |
| 5,212,130 | 5/1993 | Addiego et al. | 502/60 |

OTHER PUBLICATIONS

Green et al. *Perry's Chemical Engineer's Handbooks, Sixth Edition*, published by McGraw-Hill, New York (1984) pp. 19-89 to 19-103 (No Month).

*Primary Examiner*—Shrive Beck
*Assistant Examiner*—Timothy Meeks
*Attorney, Agent, or Firm*—Millen, White, Zelano, & Branigan, P.C.

[57] ABSTRACT

A production process for supported catalysts is described comprising:

(a) preparing a coating suspension containing at least one refractory inorganic oxide and at least some of the elements intended to constitute catalytically active phase (A);

(b) filling at least part of the open porosity of a support with this suspension;

(c) drying the filled support by centrifuging;

(d) a thermal treatment of the support to obtain a support coated by a wash coat;

(e) optionally impregnating the coated support with a solution containing the rest of, or elements of, catalytically active phase (A); and (f) thermally activating the catalyst.

This preparation process is of particular interest in the production of catalysts for treating exhaust gases of internal combustion engines, where the wash coat deposited on a support comprises in particular a refractory inorganic oxide, iron oxide and cerium oxide and, by way of a catalytically active element, at least one noble metal such as platinum, rhodium or palladium.

26 Claims, No Drawings

PRODUCTION PROCESS FOR CATALYSTS ON SUPPORTS INCLUDING A CENTRIFUGING STEP FOR THE SUPPORT AFTER COATING

BACKGROUND OF THE INVENTION

This invention relates to the production of catalysts on supports that are metallic, ceramic, or of refractory inorganic materials. It also relates to the catalysts prepared by this process.

These catalysts can be used, for example, in the treatment of exhaust gases from internal combustion engines with or without spark ignition, operating with a liquid fuel, liquefied petroleum gas or compressed natural gas.

Catalysts are generally prepared on supports in the form of balls, pellets, extruded pieces, fabric consisting of braided or interlocked fibers, or in the form of monolithic structures. These monoliths, made of ceramic or metal, can be in the form of a honeycomb, a winding of strips or a stack of metallic plates with straight or zig-zag channels, or can even be foams or interlocked metallic or ceramic fibers, or other refractory materials.

So that these supports can be made into catalysts, it is necessary to deposit, on their surface, at least one catalytically active compound for the reaction in question. Generally these supports, for example fabrics or monoliths, have a small specific surface area, less than several $m^2/g$ and, to achieve a maximum dispersal of the catalytically active element at its surface, it is desirable to increase this specific surface area: one of the ways of achieving this consists in depositing, on the support, a refractory inorganic material with a large specific surface area, greater than several dozen or hundred $m^2/g$.

The unit operation (generally called "coating"), which consists in achieving, on this support, the deposit (called a "wash coat") of a material or materials with large specific surface area, is generally broken down into 3 phases:

- a phase of wetting the support by an excess of suspension containing at least one large-surface material, achieved either by immersing the support in the suspension or by filling (under pressure or under vacuum) the empty structure of the support or by spraying some suspension on and/or in the support;
- a phase of eliminating the excess suspension, generally performed by having a gas flow sweep over the structure of the support, such as blowing or suction; and
- a phase of fixing the "wash coat" on the surface of the support by thermal treatment.

SUMMARY OF THE INVENTION

The applicant has found a new technique (in particular for coating supports in the form of fabrics or monoliths and in particular for coating fibrillar supports), for eliminating the excess coating suspension. Actually, the techniques mentioned above do not make it possible to achieve, with maximum efficiency and speed, the maximum elimination of the excess "wash coat," which contributes to a more or less considerable plugging of the porosity of the coated support and, consequently, to an increase in feed losses and to poor operation of the final catalyst.

The process of the invention can be defined in a general way by the fact that it successively comprises:

- a step (a) in which an aqueous suspension containing particles of at least one refractory inorganic oxide with large specific surface area and optionally at least some of at least one element of catalytically active phase (A) is prepared;
- a step (b) in which at least part of the open porosity of said support is filled by the suspension prepared in step (a);
- a step (c) in which the support filled at least partially with the suspension is subjected to removal of excess suspension by axial centrifuging;
- a step (d) in which the centrifuged, support is thermally treated; so as to obtain a support coated with a wash coat;
- steps (b), (c), and (d) can be performed successively several times;
- optionally a step (e) in which the coated support is impregnated with a solution containing the rest of the element or elements of catalytically active phase (A); and
- a step (f) in which the coated and impregnated support is thermally activated.

This invention thus relates to a new process for preparing a catalyst on a support of the braided- or interlocked-fiber type or of a metallic monolith-type with a stacked structure (superposition of more or less wavy strips), characterized in that the step of coating the material with a large specific surface area comprises at least one phase of centrifuging the support filled with suspension. This phase can optionally be preceded, accompanied or followed by a blowing or suctioning phase. The coated support, dried and calcined, is then impregnated with precursor agents of the catalytically active phase if they have not been introduced in advance into the coating suspension, then thermally activated.

The supports used can be fabrics or foams consisting of silicon fibers or other refractory inorganic materials, or of monoliths made by the interlocking or braiding of metallic fibers. In the latter case and for particular conditions of use (for example, automobile post-combustion), stainless steel comprising iron, chromium and aluminum will undergo a specific pretreatment (generally oxidizing, to develop a fine protective layer of alumina on the surface) to avoid its corrosion under conditions of use. Some monolithic supports made either by winding or by stacking more or less wavy metallic strips with straight or zig zag channels can also be treated according to the technique of the invention.

One of the parameters that characterizes these supports is their open porosity, defined by the equation:

$$\frac{100 \times (\text{geometric volume of the support} - \text{actual volume occupied by matter})}{(\text{geometric volume of the support})}$$

which will advantageously be between 80% and 99.9%, preferably between 90 and 99.5% and in a preferred way between 95 and 99% so that the pressure drop ("feed losses") caused by the passage of the exhaust gases through the support are not too much of a penalty.

The first step in preparing the catalyst is to wet the support with a large excess of suspension containing particles of at least one large-surface inorganic oxide, optionally with catalytically active agents and/or chemically or thermally stabilizing agents. This wetting can be performed either by immersing the support in the suspension, or by injecting, under pressure or by suction under partial vacuum, some suspension into the monolith, or even by spraying it as a fine mist on and into the support. In the suspension, the sizes of the particles are generally less than 500 microns, preferably less than 100 microns.

The period of immersion, spraying or passage of the suspension over the support is between 5 s and 300 s, preferably between 5 s and 60 s and, in a preferred way, between 10 s and 30 s.

Subsequently, the operation of axial centrifuging is performed, which involves placing the object to be centrifuged (i.e., the support containing the suspension) in the rotational axis of the motor, so that an acceleration gradient between zero (in the rotational axis of the motor) and a maximum value at the periphery of the object is established. Such an arrangement makes it possible to evacuate the excess suspension over the entire peripheral surface of the object.

In practice, the support to be centrifuged is fastened to the rotational shaft of a motor, either directly or by the intermediary of a plate, the support in all cases being about centered on the axis of the motor shaft; the latter having any direction.

It is, however, most often vertical and, in this case, the support to be centrifuged is placed on a plate that is turning or even suspended on the motor shaft.

The rotational speed of the system can be between 10 and 2,000 t/min, preferably between 50 and 1,500 t/min. and, in a preferred way, between 100 and 1,000 t/min.

The centrifuging period is generally between 0.05 and 5 minutes, preferably between 0.1 and 2 min. and preferably between 0.2 and 1 min.

The temperature of the centrifuging is generally between 0° and 80° C., but preferably between 10° and 40° C.

To improve this operation of eliminating the excess suspension as well as improve the homogeneity of the distribution of the remaining fraction, a blowing operation can be performed. However, so that it is efficient, it is preferable to guide and partially channel the blowing gas jet so it crosses the support in a perpendicular direction while taking the shortest route, thus avoiding its dispersal in the entire monolith and, consequently, its loss of efficiency. To attain this goal, a mask will be placed over the entire support, except for two blowing apertures that are diametrically opposite (gas inlet and outlet). It will also be integral with the blowing element to make it possible for the monolith to rotate and be entirely swept.

These blowing apertures, of a height equal to that of the support and of the blowing element, will be able to have an opening of 0.5 to 10 mm and preferably between 1 and 5 mm. The linear speed of the gas at the outlet of the blowing aperture can be between 1 and 50 m/s and preferably between 5 and 30 m/s.

To eliminate the preparation water of the suspension and to fix the "wash coat" on the support, a thermal treatment is performed. The temperature of calcination under air is generally between 100° and 1,100° C. and preferably between 200° and 800° C.

In the case where the deposited quantity of "wash coat" is insufficient, one or several other coating operations can be performed according to the same procedure.

If the catalytically active phase has not been introduced into the coating suspension, the coated monolith will be impregnated by one or several solutions of a precursor or precursors of active metals. A final thermal treatment intended to activate the catalyst will be performed either in oxidizing atmosphere (air or nitrogen-oxygen mixture), neutral atmosphere (nitrogen) or reducing atmosphere (hydrogen-nitrogen, or gas from the incomplete combustion of a natural gas, or of a liquefied petroleum gas, or of a liquid fuel).

The temperature of this treatment is generally between 100° and 1,100° C. but preferably between 300° and 700° C.

The process of the invention is applicable more particularly to the production of catalysts intended for the treatment of exhaust gases from internal combustion engines of the diesel or ignition spark type operating either with gasoline or with liquefied petroleum gases or with compressed natural gas.

The supports used are generally metallic supports with volumes of 0.005 to 20 liters with either a fibrillar structure (open porosity 90 to 99.5%) or with a structure of the type with wound or stacked strips. Advantageously, they will first be preoxidized in air, for example between 800° and 1,100° C.

The coating suspension is prepared in an aqueous environment preferably acidified by nitric acid, acetic acid or formic acid. It includes refractory inorganic oxides such as the alpha, gamma, delta, eta, theta, kappa, khi aluminas, silica, the alumina silicas, the zeolites, the magnesium silicas, titanium oxide and their mixtures.

Mass concentrations (expressed in relation to the total dry matter of the suspension, which would have been dried, then calcined at 1,000° C.) of cerium oxide ($CeO_2$) between 0.1 and 50%, preferably between 0.2 and 25% and, in a preferred way, between 0.5 and 5%, and of iron oxide ($Fe_2O_3$) between 0.1 and 10%, preferably between 0.2 and 5% and, in a preferred way, between 0.5 and 2% weight, are introduced either in the form of oxides, oxide precursor salts or impregnated in advance on at least one of the above refractory oxides.

To improve the adherence of the "wash coat" on the metallic support, mineral binders (such as aluminas of the boehmite or pseudo-boehmite type) or organic binders (acacia gums, cellulose or acrylic compounds) are added to the suspension in amounts varying between 0.1 and 10% weight relative to the weight of the coating suspension.

To give the "wash coat" good thermal stability, compounds of at least one element (B) selected from among the alkali metals or alkaline-earth metals, and compounds of at least one element belonging to the rare earths (atomic numbers 57 to 71 inclusive) can optionally be added in proportions going from 0 to 10% and preferably from 0 to 5% weight (relative to the quantity of dry matter).

The "wash coat" content recommended for these catalysts for purifying exhaust gases of an internal combustion engine is between 20 and 250 g per liter of support and preferably between 50 and 150 g per liter. For the largest contents, at least two coating operations are necessary, a drying or calcination step being performed between the two.

Catalytically active phase (A) comprises at least one element of groups VIB, VIIB, VIII or IB of the CAS periodic table. The active phase can be introduced partially or completely during the coating phase in the form of at least one inorganic oxide first impregnated by at least part of at least one of the constituents of this active phase, or by impregnation, on the coated support, by the remaining part of, or all of, these constituents. This impregnation can be performed starting with one or several solutions containing the precursor salts of precious metals such as platinum, palladium, rhodium, ruthenium, gold and silver and optionally metal transition salts such as copper, cobalt and nickel. The quantities in the catalyst are between 0.05 and 3 g per liter of catalyst, preferably between 0.1 and 2 g per liter and, in a preferred way, between 0.5 and 1.5 g per liter.

The following examples illustrate the invention. Examples 4 to 7 are given by way of comparison.

In the foregoing and in the following examples, all temperatures are set forth uncorrected in degrees Celsius; and, unless otherwise indicated, all parts and percentages are by weight.

The entire disclosure of corresponding French application No. 93/09482, filed Jul. 29, 1993 is hereby incorporated by reference.

EXAMPLES

Example 1

Into 5 l of permutated water diluted with the equivalent of 30 g of nitric acid, there is poured 84 g of cerium oxide ($CeO_2$), 28 g of iron oxide ($Fe_2O_3$), 1,290 g of gamma-type alumina and 180 g of pseudo-boehmite-type alumina equivalent. This suspension is ground so that the maximum size of the particles is less than 10 microns. A 0.943 liter (d=100 mm–L=120 mm) metallic monolith with fibrillar structure, i.e., composed by the interlocking of metallic fibers 50 microns thick, 0.5 mm wide and of variable length (Gilphal 135 Ce-type), densified, then stiffened by electrical discharge machining, is preoxidized at 900° C. in air for 10 hours. This support, with open porosity equal to 98% (ratio between volume of the part and actual volume of matter), is immersed in this suspension for 30 seconds.

The monolith filled with suspension is placed on a support that is made to rotate at a speed of 800 t/min. for 30 seconds. During this centrifuging, more than 70% of the suspension is drained off. The coated support is then dried, then calcined in a furnace whose temperature is kept at 600° C. for 2 hours. These steps of immersion, centrifuging and calcination are repeated a second time to deposit the equivalent of 100 g of "wash coat" (wash coat of the catalyst) per liter of support.

The coated metallic monolith is then immersed in a solution of precious metals so that the quantity of metals fixed after shaking, drying and calcination at 500° C. for 2 hours is 1.06 g per liter of support with a mass ratio of platinum/rhodium of 5.

Example 2

A monolith composed of the same interlocking of metallic steel fibers of the "Gilphal 135 Ce" type as above, but intended for a radial (and no longer lengthwise) gas flow (annular front section whose external diameter of the crown is 120 mm and interior diameter 40 mm, the length being 120 mm) and with open porosity equal to 95%, is dipped in 8 liters of suspension containing 1,500 g of gamma alumina impregnated in advance with the equivalent of 6% weight of cerium oxide and 2% weight of iron oxide, 300 g of pseudo-boehmite-type alumina equivalent and 35 g of acetic acid. After 30 seconds of immersion, the fibrillar support is drained, then placed on a turning plate whose rotational speed is programmed for 400 t/min. for a period of 60 seconds. The fraction of suspension eliminated during this operation of drying by centrifuging is 65%. The coated support is then dried at 150° C., then calcined at 600° C. for 2 hours. The mass of the deposited wash coat is 32 g. These unit coating steps (immersion, centrifuging and thermal treatment) are repeated twice more: the overall quantity of the wash coat deposited then corresponds to a mass of 105 g of "wash coat" per liter of support. This coated support is then impregnated by a solution containing nonchlorinated salts of platinum and rhodium so that the precious metal content is 1.5 g per liter of support with a mass ratio of Pt/Rh of 8.

Example 3

Example 2 is reproduced the same way except that one blowing step is performed at the end of the step of drying by centrifuging. The monolith is placed on a turning plate then centrifuged at 300 t/min. for 30 s. It is then equipped with a mask that envelops it entirely except for two diametrically opposite apertures cut off over the entire height of the monolith and over a width of 2 mm. This mask is also connected to a blowing element equipped with the same aperture which, attached to the mask, will make it possible for the gas to cross the monolith crosswise from the interior toward the exterior. The blowing element and the mask remaining fixed, the monolith is made to turn at 150 t/min. for 30 s while regulating the gas throughput so that the linear speed measured at the outlet of the mask aperture is 10 m/s (measurement performed on non-coated monolith). The wash coat content of the coated support, blown-dried by centrifuging, then dried and calcined at 600° C., is 30 g per liter of support. This series of unit operations is repeated twice more to obtain finally a mass of the wash coat equal to 102 g per liter of support. The impregnation phase and the overall quantity of the precious metals deposited are identical to those of example 2 but the metals used are palladium and platinum with a mass ratio of Pt/Pd of 1.

Example 4 (Comparison)

Example 1 is reproduced exactly except that the monolith, out of the coating bath, is no longer subjected to a drying by centrifuging but only to blowing. To do this, the monolith is positioned 10 mm away from a blowing aperture which, by slow movement, will sweep over the plane surface of the fibrillar support. The dimensions of this aperture are 2 mm of opening and 110 mm long (equal to the diameter of the support). The movement speed of the blowing aperture above the support is 2 mm per second and the air throughput is 40 m³/h (throughput corresponding to that measured in the above example).

After the aperture above the monolith goes back and forth twice, the mass fraction of the suspension eliminated is only 15%. Another blowing step performed under the same conditions made it possible to eliminate only 5% additional weight of suspension.

After drying and calcination under the same conditions as those of example 1, the mass of "wash coat" deposited was 195 g.

The step of impregnation with metals is performed as in example 1.

Example 5 (Comparison)

The test described in example 2 is reproduced except that the monolith is not dried by centrifuging but is only blown under the conditions of example 4.

After thermal treatment at 600° C., the mass of "wash coat" deposited in a single coating operation is 182 g.

The step of impregnation of precious metals is identical to that described in example 2.

Example 6 (Comparison)

The test described in example 3 is reproduced except that the monolith is not dried by centrifuging but is only blown under the same conditions as those of this example.

After thermal treatment at 600° C., the mass of "wash coat" deposited in a single coating operation is 174 g.

The step of impregnation of precious metals is identical to that described in example 3.

Example 7 (Comparison)

The catalyst described in example 4 is reproduced exactly except that the dry matter content in the suspension is greatly reduced (dilution by adding water), to deposit, as in example 1, the equivalent of 100 g of wash coat per liter of support, but in a single coating operation. The type and quantity of precious metals impregnated on this coated support are identical to that of example 1.

Example 8

An oval-shaped monolith with 1.385 liters volume (150× 88×120 mm) prepared by stacking wavy metallic strips (Gilphal-type steel) 50 microns thick, is preoxidized in air at 950° C. for 8 hours, then immersed, at ambient temperature, in 6 liters of suspension containing the equivalents of 1,900 g of alumina, 680 g of cerium oxide ($CeO_2$), 105 g of iron oxide ($Fe_2O_3$) and 50 g of lanthanum oxide ($La_2O_3$), 90 g of acetic acid and 15 g of acacia gum.

The support is drained, then placed horizontally on a turning plate whose rotational speed is programmed for 60 seconds at 600 t/min. After this centrifuging step, where more than 60% of the suspension was ejected, the support is dried, then calcined for 4 hours at 700° C. The mass of "wash coat" is then 45 g. A second coating performed under the same conditions leads, after thermal treatment, to a dry matter content of 101 g per liter of support.

On this wash coat with large specific surface area (145 $m^2/g$), the equivalent of 0.22 g of rhodium and 1.76 g of palladium are impregnated by the intermediary of a solution containing nitrated salts of precious metals.

The thermal treatment of the impregnated monolith is performed in a first phase in an oxidizing environment in a furnace heated by in situ combustion of natural gas with an oxygen excess relative to the stoichiometry of its combustion for 2 hours at 500° C. The air/gas ratio is then progressively lowered until the environment becomes reducing; the treatment time under these conditions is 30 min.

Example 9

A monolith of 0.115 l (d=35 mm L=120 mm) consisting of the winding of a 5 mm-thick fabric made of silica fibers and with open porosity equal to 99.5% has 1.5 l of an aqueous suspension containing 150 g of gamma alumina preimpregnated with 1.55% weight of platinum, 80 g of a gamma alumina preimpregnated with the equivalent of 10% weight of cerium and the equivalent of 4% of iron, 25 g of pseudo-boehmite alumina and 5 g of acetic acid pass through it. This operation is performed by placing the monolith in a system that perfectly envelops the support in a vertical position, the upper part being equipped with a reservoir into which part of the suspension is introduced, the lower part being also equipped with a reservoir connected to a draft element to achieve a partial vacuum and promote the flow of the suspension, ground in advance (average grain size equal to 3 microns), through the fabric of wound fibers.

After this operation of wetting by the suspension, the support is placed vertically on a turning plate whose increase in rotational speed is programmed between 0 and 300 t/min in 30 seconds (rotating it immediately at 300 t/min being impossible because of too great a deformation of the monolith when it is saturated with suspension), this speed being kept constant for 30 seconds.

To deposit the equivalent of 82 g/l of "wash coat" on this support, four coating steps are required, each of them being followed by a drying or calcination step (imperative for the last layer).

The remainder of the active phase is introduced onto the coated monolith by impregnation of a solution containing palladium nitrate so that the overall metals content is 2.214 g per liter with a Pd/Pt ratio of 2.

Example 10

A metallic monolith (oval section of 115 $cm^2$ and 75 mm long) with a stacked structure with zig zag channels is coated by a suspension containing the equivalent of 500 g of alumina, 25 g of cerium oxide, 10 g of iron oxide and 5 g of barium oxide. This suspension, ground so the maximum particle size is less than 2 microns, is sprayed on each face of the support with sufficient pressure so that it perfectly penetrates to the interior of all the channels of the monolith.

The monolith, wetted by the suspension and placed flat on a turning plate, is subjected to a centrifugal force produced by its rotation at 400 t/min. for 60 seconds. Under these conditions, more than 45% of the suspension deposited during the spraying operation is eliminated and the mass of "wash coat" fixed on the support after calcination is 21 g/l. This coating step is repeated twice more so the coated mass is 91 g.

A dinitrosodiamino-platinum solution is impregnated on the coated support so that, after calcination, the content of precious metal catalyst is 1.76 g/l.

Example 11

Measurement of the Pressure Drop

One of the causes of loss of power of a vehicle being the back pressure that the exhaust gases must overcome at the engine outlet, a measurement of feed loss was performed on the catalysts prepared according to the invention, i.e., having undergone a centrifuging operation after wetting by the coating suspension, and those prepared solely by blowing.

This measure is performed by connecting the catalyst equipped with its casing to a mass flow meter that makes it possible to provide and regulate an air throughput of more than 150 $m^3/h$. A pressure measurement is performed by a U-shaped tube filled with water, one of whose ends is connected to the catalyst inlet and the other exposed to the open air. The values measured for an air throughput corresponding to 100,000 times the volume of the catalyst =100,000 h−1) are summarized in the table below:

TABLE 1

| Catalyst Ex. # | Support | Process | Wash Coat Content (g/l) | Pressure Drop (mm of water) |
| --- | --- | --- | --- | --- |
| 1 (invent.) | met. fib. lg 180 | centr. | 100 (2*) | |
| 2 (invent.) | met. fib. rd | centr. | 105 (3*) | 120 |
| 3 (invent.) | " | centr. + B | 108 (3*) | 105 |
| 4 (comparative) | met. fib. lg | B | 195 (1*) | 450 |
| 5 (comparative) | met. fib. rd | B | 182 (1*) | 370 |
| 6 (comparative) | | B | 174 (1*) | 340 |
| 7 (comparative) | met. fib. lg | B | 100 (1*) | 270 |
| 8 (invent.) | stacked met. | centr. | 101 (2*) | 180 |
| 9 (invent.) | ceram. fib. | centr. | 82 (4*) | 145 |
| 10 (invent.) | stacked met. | centr. | 106 (3*) | 95 |

(*) number of coating steps
centr. = centrifuging step
B = blowing
fib. = fibrillar monolith
lg = lengthwise flow
rd = radial flow It can be confirmed that the catalysts of the same length, prepared according to the invention (centrifuging of the monolith filled with suspension) produce clearly smaller feed losses than those prepared according to the prior art (blowing only) when they have a gas throughput go through them whose velocity in space is constant. The very small pressure drop recorded for sample 10 results from its shorter length (75 mm instead of 120).

Example 12

Test activity on the engine bench on catalysts aged 50 h

The catalysts prepared in examples 1 to 8 are aged and tested on an engine bench (engine with 1,900 cm$^3$) equipped with a richness regulating system and operating with a fuel meeting Eurosuper specifications.

The catalysts are mounted in a metallic covering and installed on the exhaust line about 1m away from the engine.

For the aging phase, the catalysts are connected directly to the outlet of the exhaust pipe of the engine that is made to operate at a speed equivalent to that of a vehicle traveling at 150 km/h. The gases that then pass over the catalyst have a temperature close to 900° C. and the duration of this treatment is 50 h.

To evaluate the performances of each of the catalysts after this aging, the assembly is slightly changed: a system for regulating the temperature of the gases is installed between the engine and the catalyst, which makes it possible to adjust their temperature. before they pass over the catalyst, between 200° and 600° C. The richness regulating system (lambda sensor) makes it possible to feed the engine with an air-fuel mixture at the stoichiometry.

The determination of the concentrations of the various pollutants at the inlet and outlet of the catalyst is provided continuously by an infrared analyzer for carbon monoxide, by a flame ionization detector for the hydrocarbons and by a chemiluminescence analyzer for the nitrogen oxides.

The table below summarizes the results, for each of the catalysts, of the integral conversion of the main pollutants. This parameter is determined by the ratio of the integral of the curve representing the conversion of the pollutant in question between 250° and 550° C. over the integral of the curve that would result from a total conversion over the entire temperature range in question. This value of the integral conversion (or of efficiency) of the catalyst is expressed in percent.

TABLE II

| Catalyst Ex. No. | Wash Coat g/l | Metals Content* (g/ft$^3$) | Mass Ratio | Efficiency CO | NOx | HC |
|---|---|---|---|---|---|---|
| 1 (invent) | 100 | 30 | Pt/Rh = 5 | 80 | 70 | 72 |
| 2 invent) | 105 | 42.5 | Pt/Rh = 8 | 85 | 68 | 75 |
| 3 invent) | 108 | 42.5 | Pt/Pd = 1 | 82 | 61 | 74 |
| 4 (compar) | 195 | 30 | Pt/Rh = 5 | 74 | 62 | 64 |
| 5 (compar) | 182 | 42.5 | Pt/Rh = 8 | 78 | 60 | 64 |
| 6 (compar) | 174 | 42.5 | Pt/Pd = 1 | 73 | 51 | 66 |
| 7 (compar) | 100 | 30 | Pt/Rh = 5 | 77 | 64 | 67 |
| 8 (invent) | 101 | 40 | Pd/Rh = 8 | 84 | 68 | 71 |

*30 g/ft$^3$ equals 1.06 g/l
42.5 g/ft$^3$ equals 1.5 g/l
40 g/ft$^3$ equals 1.41 g/l.

For different catalytic formulations and different monolith structures (lengthwise or radial gas flow), it is observed that the catalysts prepared according to the invention are better performing than those prepared according to the prior art, although the latter have more wash coat.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the production of a catalyst, said catalyst comprising a catalytically active phase (A) deposited on a support having an open porosity of 80 to 99.9%, and comprising a monolithic structure or braided or interlocked fibers, said process comprising:

(a) preparing an aqueous suspension containing particles of at least one refractory inorganic oxide and optionally at least a part of a catalytically active phase comprising at least one catalytically active element;

(b) filling at least part of the open porosity of said support with the suspension prepared in (a);

(c) removing excess suspension from the support by axial centrifuging;

(d) thermally treating the support so as to obtain a support coated with a wash coat;

optionally repeating (b), (c) and (d);

(e) impregnating the coated support with a solution containing any remainder of said catalytically active phase; and (f) thermally activating the coated and impregnated support.

2. A process according to claim 1, wherein said support is a ceramic or metallic support, a support with a fibrillar structure or a support which is stacked or wound strips.

3. A process according to claim 1, wherein the size of the particles in the suspension is less than 500 microns.

4. A process according to claim 1, wherein, in centrifuging in (c), the rotational speed of the support is between 10 and 2,000 t/min.

5. A process according to claim 1, wherein, in (c), the time of centrifuging is between 0.05 and 5 min.

6. A process according to claim 1, wherein, in (c), the temperature of the centrifuging is between 0° and 80° C.

7. A process according to claim 1, wherein the support filled in (b) is covered with a mask having a blowing window, and is blown before, during or after centrifuging by crosswise, direct passage of a narrow jet of gas.

8. A process according to claim 7, wherein the blowing window has, over its entire height, a width of about 0.5 to 10 mm.

9. A process according to claim 7, wherein the linear speed of the blowing gas at the outlet of the blowing window is about 1 to 50 m/s.

10. A process according to claim 1, wherein, in (d), the temperature of the thermal treatment of the support is about 100° to 1,100° C.

11. A process according to claim 1, wherein at least one catalytically active element is introduced either partially or totally during coating step (b) or in step (e), by impregnating with a solution containing the precursor salts of said catalytically active element.

12. A process according to claim 1, wherein, in (f), thermal activation is performed in a neutral, oxidizing or reducing atmosphere, at a temperature of about 100° to 1,100° C.

13. A process according to claim 1, wherein the refractory oxide is alpha alumina, gamma alumina, delta alumina, eta alumina, theta alumina, kappa alumina, ro alumina, khi alumina, silica, silica-alumina, a zeolite, a magnesium silica, a titanium oxide or a mixture thereof.

14. A process according to claim 1, wherein the wash coat deposited on the support after step (d) has a mass of about 20 to 250 g per liter of support.

15. A process according to claim 1, wherein the catalytically active phase (A) comprises at least one element of groups VIB, VIIB, VIII or IB of the CAS periodic table.

16. A process according to claim 1, wherein the amount of catalytically active metal in the catalytically active phase (A) is about 0.05 to 3 g. per liter of support.

17. A process according to claim 1, wherein the suspension prepared in step (a) contains iron oxide ($Fe_2O_3$) and cerium oxide ($CeO_2$).

18. A process according to claim 17, wherein the amount of iron oxide ($Fe_2O_3$), relative to the wash coat in the catalyst, is about 0.1 to 10%.

19. A process according to claim 17, wherein the amount of cerium oxide ($CeO_2$), relative to the wash coat in the catalyst, is about 0.1 to 50% by weight.

20. A process according to claim 1, wherein the suspension prepared in step (a) contains at least one soluble or insoluble compound of at least one element B, which is an alkali metal, an alkaline-earth metal, or a rare earth metal with an atomic number from 57 to 71, inclusive.

21. A process according to claim 20, wherein the amount of the compound of element B, relative to the wash coat, is about 0 to 10%.

22. A process according to claim 1, wherein, in step (a), the suspension is prepared in an aqueous environment, optionally acidified by formic acid, acetic acid or nitric acid.

23. A process according to claim 1, wherein, in step (a), there is added to the suspension a mineral binder or an organic binder at an amount of about 0.1 and 10% relative to the coating suspension.

24. A catalyst prepared by a process according to claim 1.

25. A process according to claim 1, wherein the support is a monolith comprising a stacked structure of superposed wavy strips.

26. In a process for production of a catalyst, comprising increasing the surface area of a support having an open porosity of 80 to 99.9%, comprising a monolith or braided or interlocked fibers, by providing the support with a wash coat, the improvement wherein excess wash coat is removed by axial centrifuging.

* * * * *